United States Patent [19]

Zimmerman

[11] 4,159,058
[45] Jun. 26, 1979

[54] LUMBER STACKING APPARATUS

[76] Inventor: Edwin H. Zimmerman, R.D. 1, New Holland, Pa. 17557

[21] Appl. No.: 807,805

[22] Filed: Jun. 20, 1977

[51] Int. Cl.² .............................................. B65G 57/18
[52] U.S. Cl. ........................................ 414/84; 414/38
[58] Field of Search ................... 214/6 G, 6 DK, 6 P; 198/732; 187/8.59, 8.69, 17

[56] References Cited

U.S. PATENT DOCUMENTS

| | | | |
|---|---|---|---|
| 2,187,026 | 1/1940 | Hamachek | 198/732 |
| 2,639,784 | 5/1953 | Strock | 187/17 |
| 3,393,812 | 7/1968 | Mayo et al. | 214/6 G X |
| 3,437,215 | 4/1969 | Lunden | 214/6 DK |
| 3,594,977 | 7/1971 | Grasvoll | 214/6 DK X |
| 3,610,443 | 10/1971 | Berge et al. | 214/6 DK |
| 3,648,857 | 3/1972 | Grasvoll | 214/6 G |
| 3,737,052 | 6/1973 | Lunden | 214/6 G X |
| 3,737,053 | 6/1973 | Lunden | 214/6 G X |

Primary Examiner—L. J. Paperner
Attorney, Agent, or Firm—C. Hercus Just

[57] ABSTRACT

A lumber stacker comprising a vertical frame provided with a feed elevator on the front end of the frame which delivers short stacks of boards to a horizonal advancing conveyor on the upper portion of the frame and on which a layer of such stacks accumulates to a predetermined amount when a horizontal elevating frame raises to lift the accumulation of stacks from the advancing conveyor and places them on a horizontal projectable supporting plate which is moved past the rear of the frame and is lowered by downward movement of the elevating frame onto a supporting surface or top of a stack being formed, after which the supporting plate is retracted onto the elevating frame from beneath the accumulated layer of stacks and returns to the initial starting position.

7 Claims, 7 Drawing Figures

LUMBER STACKING APPARATUS

BACKGROUND OF THE INVENTION

This invention pertains to a lumber stacking apparatus and, more particularly, to a stacking apparatus which receives boards preferably of uniform cross-section in size and uniform length which are discharged from a conveyor onto which they have been placed after being sawed into suitable length. The stacking apparatus is designed to accept from the discharge conveyor of the saw short stacks of a limited number of the boards, accumulate a limited number of such short stacks at a suitable area in the apparatus, and when a predetermined number of such short stacks, which are arranged in a layer thereof, have been assembled, they are lowered onto a stack of such layers which have previously been discharged. If desired, the accumulated layers of stacks may be arranged on a pallet for subsequent handling by lift trucks and the like.

Various types of lumber stacking mechanisms and apparatus have been developed heretofore and some of them are available on the market for use by various commercial establishments, such as those, for example, making pallets which require a vast number of boards of uniform size, cut to uniform length, as well as other woodworking establishments in which stacks of lumber of uniform size are required. In general, it has been found that the commercial apparatus and machines presently available on the market are relatively large and complex and the selling price of the same is very substantial, certain of these being in the sales range of thirty thousand dollars or higher.

Certain of the devices which have been referred to above are illustrated in the following patents:

| | | |
|---|---|---|
| 2,854,152 | Miller | Sept. 30, 1958 |
| 3,080,052 | Hanbury | Mar. 5, 1963 |
| 3,241,689 | Nerrinder | Mar. 22, 1966 |
| 3,437,215 | Lunden | Apr. 8, 1969 |
| 3,531,001 | Lunden | Sept. 29, 1970 |
| 3,737,052 | Lunden | June 5, 1973 |

Although the mechanisms illustrated and described in the aforementioned patents have a certain similarity to each other, as well as to the present invention, the ultimate operation of the present invention is different in many details from those illustrated and shown in said patents, primarily for purposes of simplifying the mechanism without sacrificing efficiency of operation and thereby providing an apparatus which is capable of being manufactured and sold for substantially less than the prices of a comparable existing machine now available on the market.

SUMMARY OF THE INVENTION

It is one of the principal objects of the invention to provide a lumber stacking apparatus in which, by the employment of a pair of endless chains which support a horizontal elevating frame which is substantially coextensive in area with the outline of the main vertical supporting frame and arranging vertical sections of said chains respectively at the corners of said elevating frame which are attached to said vertical sections of said chains, a very simple means of support for said elevating frame is furnished in a manner which will minimize canting of said elevating frame during operation thereof and especially under the conditions when a full contemplated load of boards is positioned upon the board-supporting member which is slidably projectable from the rear end of said elevating frame and in which position, the elevating frame is lowered to dispose the load upon the board-supporting member upon a supporting surface when a stack thereof is initially being formed or upon the top of a previously formed stack, following which the board-supporting member is retracted from its load and the latter is brought to rest upon the top of the previously deposited stack.

It is another object of the invention to employ a plate member as the horizontally projectable board-supporting member and also employ anti-friction means which facilitate the movement of the plate when loaded between its load-receiving position and its projected position in which the plate and the elevating frame which carries it are lowered onto the stack for deposit of the load of the board-supporting plate thereon.

It is a further object of the invention to arrange each of a pair of endless chains respectively disposed in vertical planes adjacent opposite sides of the stationary vertical frame so as to have not only the aforementioned vertical sections thereof adjacent the corners of the stationary vertical frame, as well as the corners of the horizontal elevating frame, but also dispose other sections of said chains in an X-configuration which stabilizes the movement of said vertical sections of said chain, as well as afford ready means for simultaneously moving said vertical sections respectively upward or downward and thereby carry with them the elevating frame and the horizontally projectable board-supporting plate therewith.

Still another object of the invention is to provide on the front end of the stationary vertical frame, an elevating unit which employs a pair of endless chains having spans which slope upwardly and rearwardly to carry short stacks of boards from a loading station at the discharge end of a feeding conveyor and elevates said short stacks successively to an advancing conveyor extending horizontally along the upper portion of said stationary vertical frame for purposes of accumulating a layer of such short stacks on said advancing conveyor until a predetermined number of such stacks have been accumulated thereon, said chains of the elevating unit having a series of pivoted arms thereon spaced at even distances along said chains, said arms comprising angularly related legs respectively comprising supports for the boards and positioning members which dispose said legs normally to the outermost span of said chain for purposes of elevating said short stacks of boards as aforesaid, said elevating unit also including rails adjacent and parallel to the outer spans of said chains and terminating adjacent opposite ends of said spans respectively to permit said supports to depend downwardly while moving downward from said advancing conveyor and then be projected to said positions normal to the outer spans of said chains and thereby be positioned to support said short stacks of boards to elevate the same to said advancing conveyor.

Further additional objects of the invention are to provide simple but effective hydraulic motor means to operate the various conveyors, chains, and other moving parts in a manner which requires relatively simple control means which include solenoidal operated valves, the entire operation of the apparatus being such that all elements thereof function automatically and include safety means to prevent damage to the apparatus in the event of any malfunction thereof.

Details of the foregoing objects and of the invention, as well as other objects thereof are set forth in the following specification and illustrated in the accompanying drawings comprising a part thereof.

DETAILED DESCRIPTION

Figure 1:
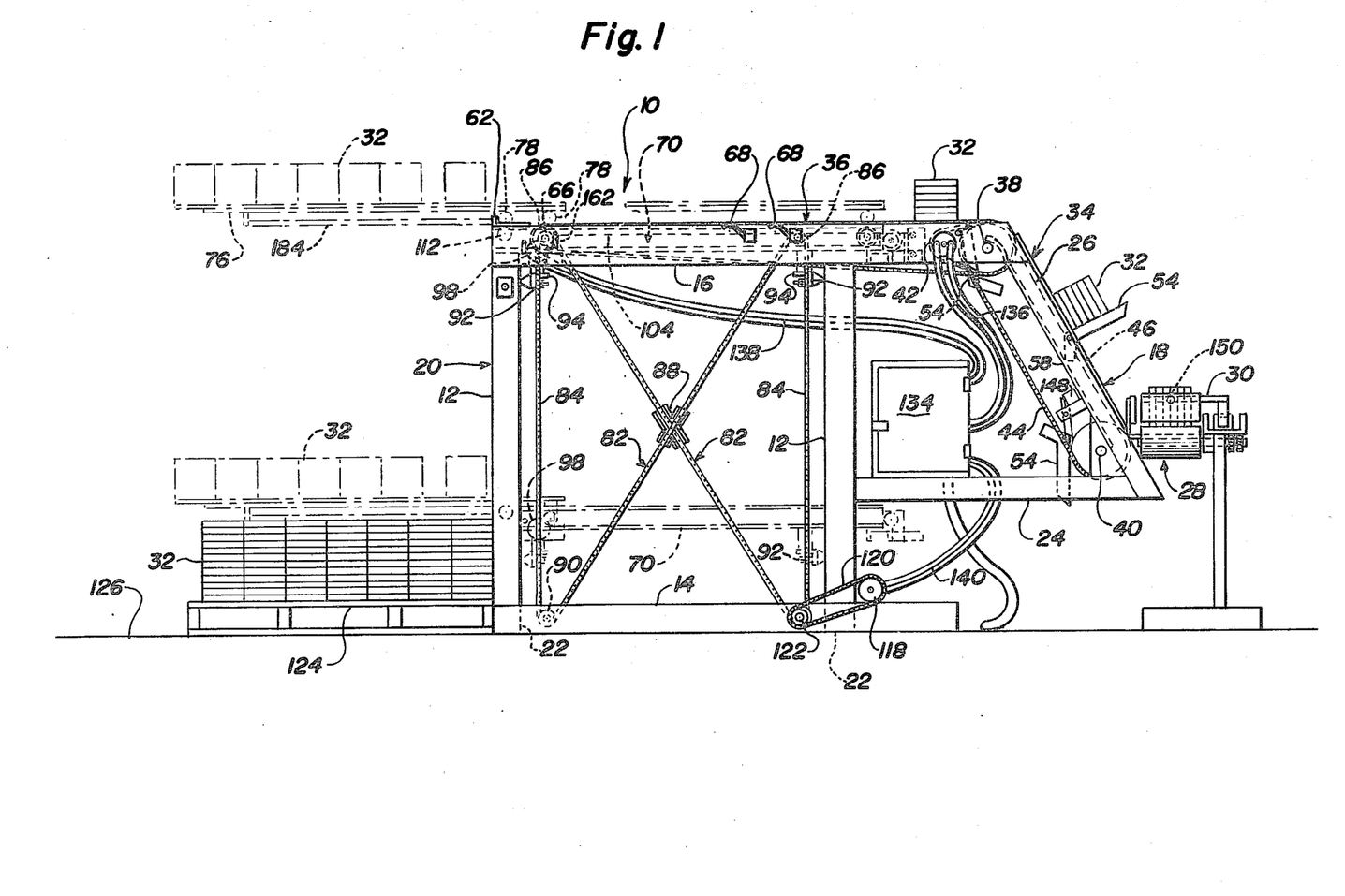
FIG. 1 is a side elevation of a lumber stacking apparatus embodying the principles of the present invention and illustrating in full lines and phantom respective positions of certain movable members of the apparatus to illustrate the function thereof.
Figure 2:
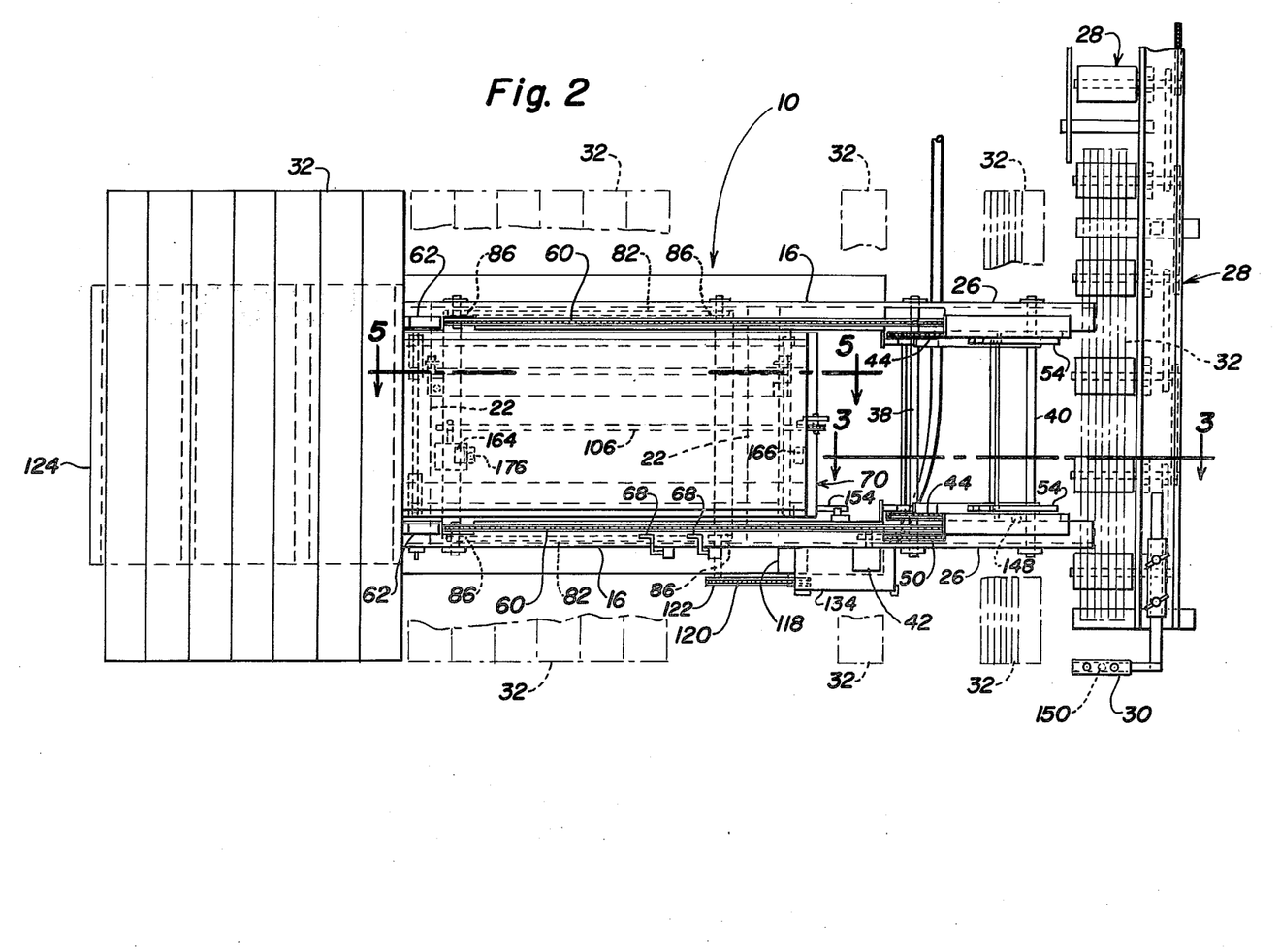
FIG. 2 is a top plan view of the apparatus shown in FIG. 1 as viewed from the reverse side thereof as illustrated in FIG. 1.

Referring particularly to FIGS. 1 and 2, the apparatus comprising the present invention includes a stationary vertical frame 10 comprising four vertical leg members 12 which extend from horizontal bottom frame members 14. A pair of the legs 12 are located respectively adjacent each side of the frame 10 and the upper ends of the legs 12 have an upper side frame member 16 secured thereto. The upper side frame members 16 extend to the front end 18 of the apparatus 10 and the opposite end is the rear end 20 of the frame. Sturdy transverse frame members 22 also extend between the upper side members 16 of the frame to provide a rigid and rugged supporting frame for the entire apparatus.

Also extending forwardly from the forwardmost legs 12 are additional horizontal frame members 24 and extending upwardly and rearwardly from the forward ends of the members 24 are sloping frame members 26 which, together with the frame members 24, comprise part of and support other details of an elevating unit for the apparatus.

The lumber stacker comprising the present invention is intended to receive boards from a saw unit which, without restriction thereto, is of the type which saws a group of similar long boards, such as five or six of equal length, into uniform shorter lengths and delivers them to a feed conveyor 28 which has an adjustable stop 30 against which the forward end of a group of advancing boards 32 of uniform length abuts in order to center said group of boards with respect to the elevating unit 34. It is to be understood, however, that the apparatus is adapted to accommodate single boards, especially if of appropriate thickness to warrant doing so, as distinguished from a group of boards 32. As illustrated in FIG. 1, it will be seen that the boards are disposed vertically so that they are also elevated substantially in said condition but are then turned horizontally when they reach the upper end of the elevating unit, where they are received upon advancing conveyor 36, details of which are described hereinafter.

The elevating unit 34 comprises a pair of shafts 38 and 40. Shaft 38 is driven by hydraulic motor 42 and shaft 40 is an idler. A pair of endless chains 44 is provided, one at each side of the elevating unit 34, said chains extending around a pair of sprocket gears respectively fixed to the shafts 38 and 40 and there being a similar pair adjacent opposite ends of the shafts to provide a front span 46 which moves upward and rearward. Shaft 38 and the sprocket gears connected thereto are driven by hydraulic motor 42 through mechanism best shown in detail in FIGS. 3 and 4 and comprising a supplemental sprocket gear 48, best shown in FIG. 4 and around which an endless sprocket chain 50 extends, said chain also extending around a small sprocket spur gear 52 which is directly fixed to the outward shaft of the motor 42.

Figure 3:
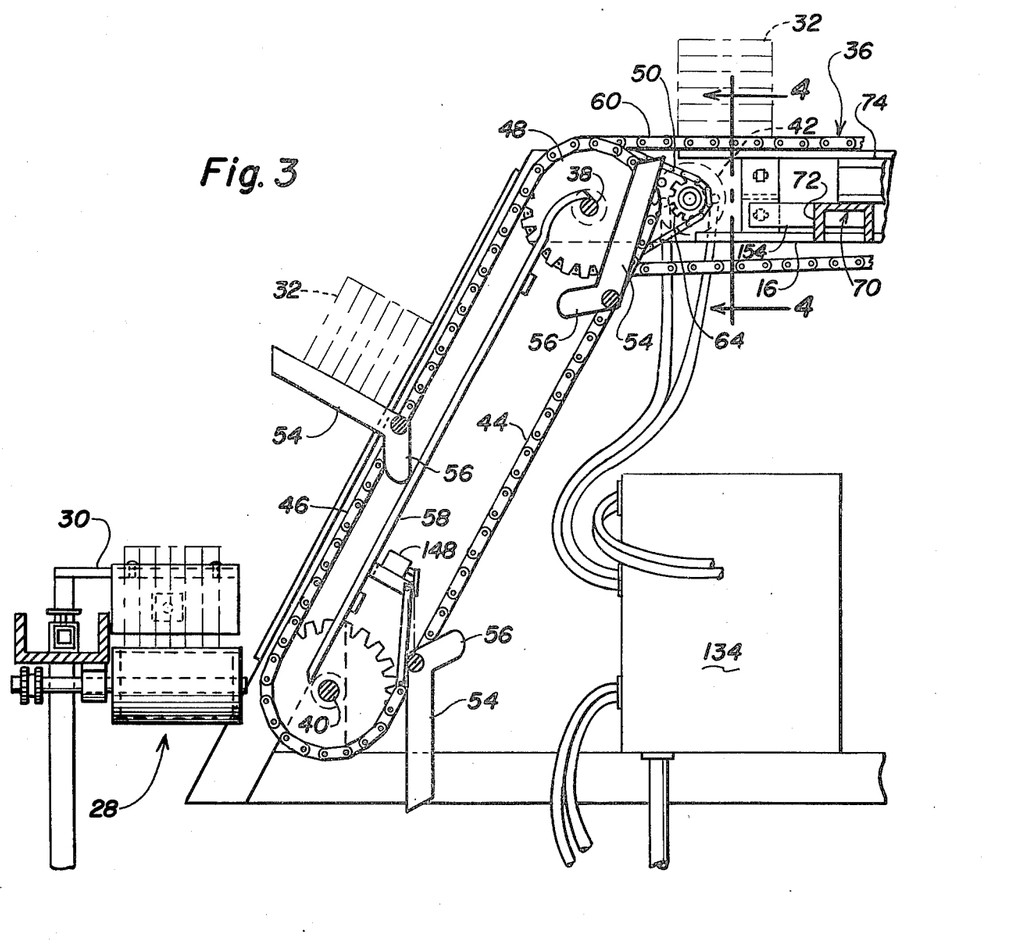
FIG. 3 is a fragmentary vertical section of the front end of the apparatus, as seen on the line 3—3 of FIG. 2, and illustrated on a larger scale than employed in FIGS. 1 and 2.

A plurality of pivoted arms 54 are respectively connected to the chains 44 at evenly spaced distances, the arms on each chain being directly opposite each other so as to elevate the respective stacks of boards 32 in substantially horizontal manner. Such relationship is maintained by virtue of the sprocket gears on the shafts 38 and 40 being fixed thereto. Particularly from FIG. 3, it will be seen that the arms 54 comprise a pair of angularly related legs, one being longer than the other, the longer leg projecting normally to the path of movement of the front span 46 of the chain, as clearly shown in FIG. 3, while the shorter leg 56 on each of the arms is engageable with guide means comprising rails 58, which are suitably supported by the portion of the frame at the front end 18 of the apparatus, said rails being slidably engaged by the legs 56 of the arms 54, as shown in FIG. 3, relative to the upper span of the chains 46. By this means, the other, longer leg of each of the arms 54 is maintained in supporting relationship to convey the short stack of boards 32 as intended until they are deposited in horizontal relationship upon the advancing conveyor 36 as also shown in FIG. 3.

Further referring to FIG. 3, it will be seen from the upper portion thereof that after the longer legs of the arms 54 have discharged a stack of boards 32 onto the advancing conveyor 36, gravity will cause the longer legs of the arms 54 to pivot the same clockwise, as viewed in FIG. 3, so that the longer arms are in depending position as shown near the lower portion of the inner span of the chains 44 in FIG. 3, but as the chains move around the sprocket on the lower shaft 40, the shorter legs 56 of the arms will engage the lower end of the rails 58 and pivot the arms clockwise until they assume the position shown midway of the front span of the chains 56 in FIG. 3.

Figure 4:
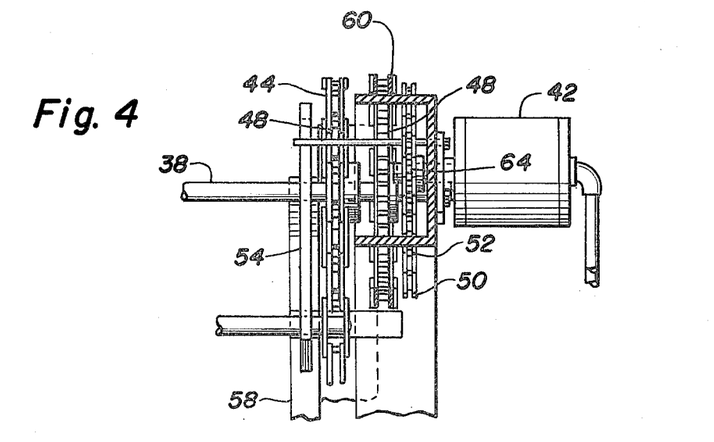
FIG. 4 is a fragmentary vertical sectional elevation of the portion of the apparatus shown in FIG. 3 as seen on the line 4—4 thereof.
Figure 5:
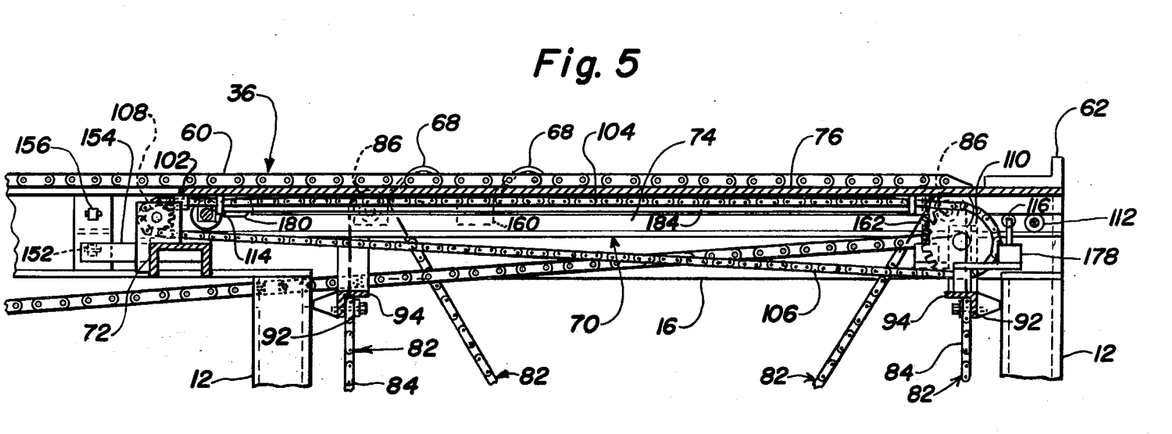
FIG. 5 is a fragmentary side elevation substantially as seen along the line 5—5 of FIG. 2 but illustrated on a larger scale than employed in FIG. 2.
Figure 6:
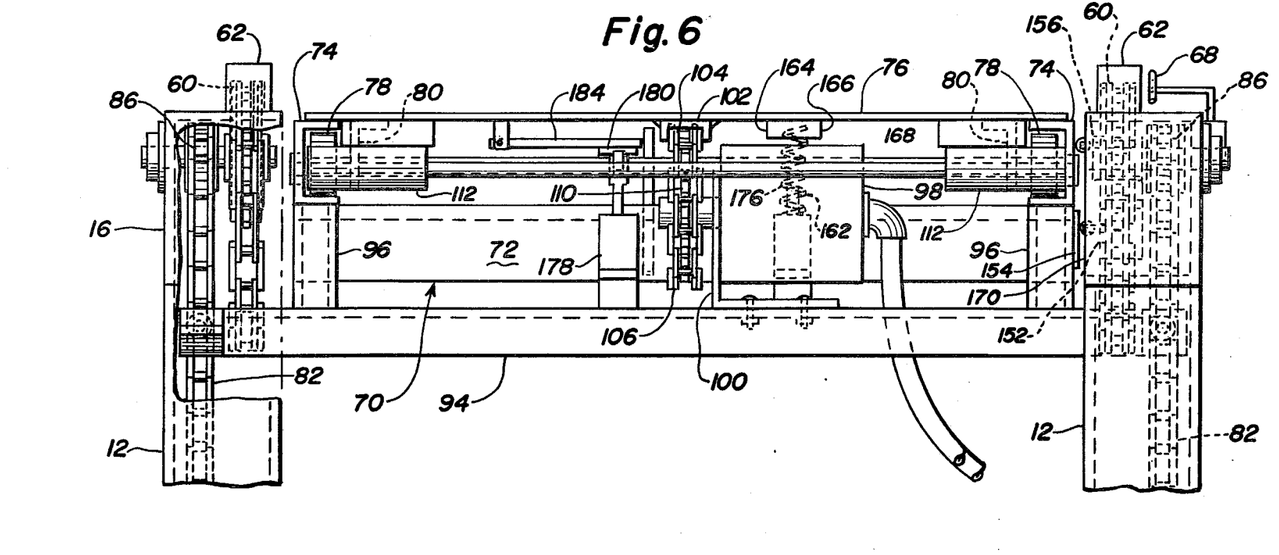
FIG. 6 is a fragmentary vertical end view of the rear end of the apparatus shown in FIGS. 1 and 2, said view illustrating only the upper portion of the stationary vertical frame and the portions of the apparatus supported thereby.

Advancing conveyor 36 is provided for purposes of receiving a series of short stacks of boards 32 and accumulating a layer thereof upon the upper spans of a pair of chains 60, said upper span being best illustrated in FIGS. 5 and 6, but also being shown in FIGS. 3 and 4. Said upper spans slide along the upper surfaces of the upper frame side member 16. For purposes of limiting the rearward movement of the short stacks of boards 32 on the advancing conveyor 36, stops 62 are provided adjacent the rearward end thereof. Stops 62 are rigidly fixed to the upper surfaces of the upper side members 16 of frame 10 and serve to permit the accumulation of a predetermined number of the short stacks of boards 32 by the foremost stack engaging the stops and successively being engaged by additional stacks while the chains 60 continue to slidably move beneath said stacks. The chains 60 are respectively driven by sprockets 64 around which the chains extend adjacent the front end of the apparatus, said sprockets being fixed to shaft 38 so as to be driven by the motor 42. The opposite ends of the chains 60 extend around idler sprocket 66 as shown in FIGS. 1 and 4. Accordingly, it will be seen that the chains 60 are continuously driven, together with the chains 44 of the elevating unit 34, and these, in turn, are driven by chain 50 which extends around the drive sprocket 52 of motor 42.

The desired number of stacks of boards 32 is determined by switch actuating members 68, which are best shown in FIGS. 1 and 5. These members are in the form of angularly extending arms having rounded outer ends which are slidably engaged by the advancing stacks 32 and when both of the arms are depressed by stacks 32 resting thereon, drive mechanism is initiated for operation of a horizontal elevating frame 70, which is best shown in end view in FIG. 6 and comprises a pair of transverse channels 72, which extend between and underlie another pair of longitudinally extending channels 74 which serve the dual purpose of slidably supporting opposite edges of a horizontal projectable board-supporting plate 76 and also receiving between the upper and lower flanges thereof anti-friction guide rollers 78, which are connected to the forward end of plate 76 by means of brackets 80 which support short shafts for the rollers 78.

From the various figures described above, it will be seen that the elevating frame 70 is substantially coextensive with the corners of the frame comprising the vertical leg members 12. There is, however, clearance for vertical movement of the frame 70 between the inner surfaces of the vertical members 12 as can readily be seen from FIG. 6, for example. Said extent of the frame 70 is an important feature of the present invention to support the rearwardly projectable support plate 76, especially when the same has been extended and supports a full contingent of stacks of boards 32 in the manner described hereinafter and in which manner there is ample stability to prevent canting of the frame 70 when the plate 76 has been projected, especially to the phantom position shown in FIG. 1. The importance is made manifest by virtue of the fact that the frame 70 has two principal functions. The first of these is to engage and elevate said contingent of stacks 32 after the switch-actuating members 68 have been depressed in order to stop further advancing movement of the chains 60 of conveyor 36. In order to project the accumulation of stacks of boards 32, it is necessary to elevate the same above the upper edges of the stops 62 and this is accomplished by the operation of endless chains 82, a pair of which respectively are disposed adjacent opposite sides of the frame 10. The arrangement of the chains is best illustrated in FIG. 1, wherein it will be seen that each chain has a vertically movable section or span 84. The upper ends of these spans respectively extend around idler sprockets 86 and then respectively extend inward and downward for movement relative to a crossover guide 88 and then continue to expand downwardly and away from each other to pass around lower idler sprocket 90 and drive sprocket 91. The details of the upper portions of said chains 82 and the idlers 86 also are shown in FIG. 5.

From FIG. 1, it will be seen that attaching clamps 92, see FIGS. 1 and 5, are mounted upon transverse angles 94, which extend beneath and support the elevating frame 70 as clearly can be seen from FIG. 6. Short upright members 96 extend between the transverse angles 94 and the longitudinally extending channel 74 to form a rigid frame which is moved vertically by the vertically movable sections 84 of the chains 82.

By means of control mechanism described in detail hereinafter, when the advancing movement of the chains 60 has stopped, the initial movement of chains 82 is in a direction to move the sections 84 vertically upward and thereby dispose the support plate 76 under the entire contingent of accumulated layer of stacks of boards 32, and at the completion of such limited vertical movement from the initial starting position of the frame 70, shown in FIGS. 1, 5 and 6, the plate 76 will have elevated all of the stacks 32 above the upper edge of stops 62, whereby projection of the plates 76 rearwardly to the exemplary phantom position shown in FIG. 1 occurs. Said projecting movement is accomplished by means of another fluid-operated motor 98, which is supported on the rearmost transverse angle 94 through the medium of supporting bracket 100, as shown in FIG. 6. Extending longitudinally beneath the plate 76 intermediately of the opposite side edges thereof and fixed thereto is a reinforcing channel 102 within which an upper span 104 of actuating chain 106 is disposed and to which said upper span is fixed. The chain 106 is endless, however, in order to extend around idler sprocket 108 and drive sprocket 110 which is fixed to the drive shaft of motor 98. The motor 98 is reversible.

When the plate 76 has been elevated to the clearance position with respect to stop 62, motor 98 is actuated to project the upper span 104 of the chain and the support plate 76 rearwardly to a predetermined position shown in exemplary manner in FIG. 1, at which time actuation of motor 98 is stopped by control means described hereinafter.

In addition to the anti-friction rollers 78 which move in channel 74, there also is provided additional anti-friction rollers 112 adjacent the rearward end of frame 10, as shown in FIG. 1 and also illustrated in FIG. 5. The rearward movement of the plate 76 is stopped by means of actuating pin 114 shown near the left-hand end of FIG. 5, which engages switch actuator 116, shown near the right-hand end of FIG. 5.

When the plate 76 and its contingent of stacks of boards 32 has been projected to the full intended position, such as shown in phantom in FIG. 1, the chains 82 are again actuated but this time to reverse the movement of the vertical sections 84 in order that the same may be lowered. Due to the fact that all of the vertical sections 84 of said chains respectively adjacent opposite corners of the frame 10 move in unison, the descending movement of the elevating frame 70 will occur while the same is maintained absolutely horizontal and it is obvious from the foregoing description and the illustration in the drawings that all vertical movement of frame 70, either upward or downward, as well as maintenance of said frame in stationary position, takes place by extremely simple but highly effective means comprising the chains 82. Movement of the chains 82 is effected by another fluid-operated motor 118, which is supported adjacent one side of the frame 10 as is clearly shown in FIGS. 1 and 2. Said motor is provided with a drive sprocket around which chain 120 extends and also extends around an additional drive sprocket 122 on the outer end of the shaft upon which drive sprocket 91 is supported.

The motor 118 is activated to perform the downward movement of the plate 76 by means of lowering the elevating frame 70 until plate 76 engages, for example, a supporting surface such as a pallet 124, see FIG. 1, or the supporting surface 126, or the upper surface of the accumulated, previously deposited stacks of boards 32 as shown in full lines in FIG. 1 in which the last accumulated layer of boards 32 is shown in the lower phantom position thereof to which they have been lowered by means of frame 70 carrying the plate 76 to such position. Upon engagement of the plate 76 with any of said supporting means or the upper surface of the accumulated stack, the movement of motor 118 stops, as controlled by means described hereinafter.

Following the stopping of the downward movement of frame 70 and plate 76, motor 98, which is reversible, will be reactivated by control means described hereinafter to move the plate 76 toward the front end of the machine, seen at the right-hand end of FIG. 1, and in doing so, the boards 32, which, as shown in FIG. 2, generally are longer than the distance between the rear pair of legs 12 of the frame 10, resulting in the stack of boards 32 nearest said rear pair of legs abutting the same when the plate 76 begins to retract to its initial position within the confines of the frame 10, and in so doing will be entirely removed from beneath the accumulation of stacks of boards 32 and deposit the same neatly and squarely upon the previously deposited accumulations of layers or rows of boards 32. When this has occurred, the plate 76 will be entirely within the confines of the space between the corner legs 12 of frame 10, and when this position has been attained, reversible fluid-motor 118 will be reactivated in a direction to elevate the vertical sections 84 of the chains 82, thereby to elevate the elevating frame 70 to its initial starting position in which plate 76 is at least no higher than the upper surfaces of the chains 60 of the advancing conveyor 36.

Figure 7:
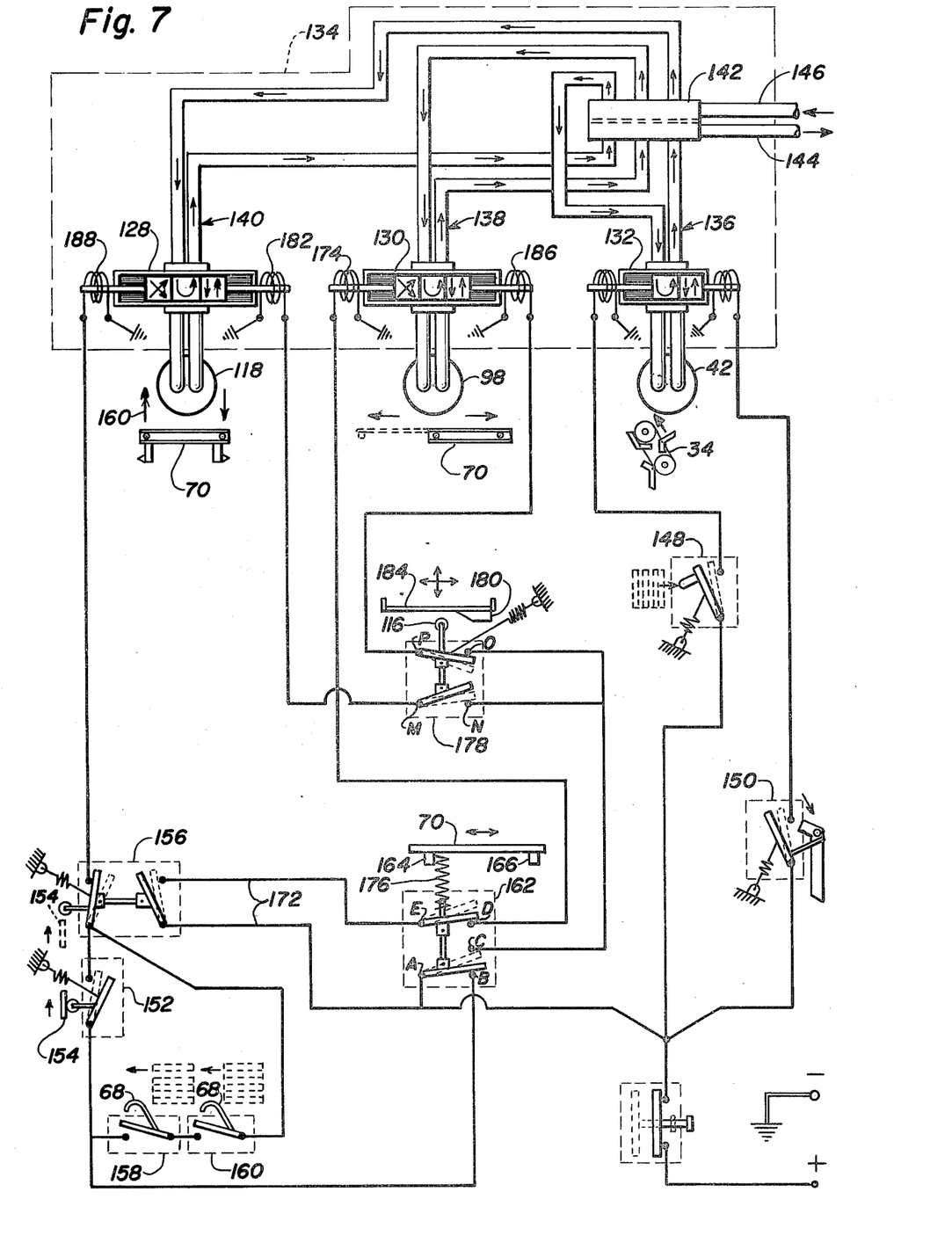
FIG. 7 is a diagrammatic power circuit illustrating the electric and pneumatic line extending between the various elements operated thereby and showing somewhat diagrammatically control switches and operating valves employed in the system.

All of the activation of motors and movements of the various units and elements of the apparatus are accomplished automatically by control mechanism which is illustrated diagrammatically in FIG. 7. The primary control elements comprise solenoid-operated fluid valves 128, 130, and 132, shown in FIG. 7, which are mounted within a control box 134 which is clearly shown in FIGS. 1 and 2 as being supported by one of the horizontal frame members 24, but it will be understood that any other suitable location may be employed. Leading from the valves within control box 134 are pairs of feed and return conduits 136, 138, and 140, which respectively are connected at opposite ends thereof to the aforementioned valves and to the motors 42, 98 and 118. Immediately beneath these motors as illustrated in FIG. 7, are small diagrammatic figures visually indicating the units and members of the apparatus to which they are connected for operation thereof. Also, as shown in FIG. 7, there is a reservoir 142, which is mounted in any appropriate location within the frame of the apparatus and within which a suitable quantity of operating hydraulic fluid is maintained. Said reservoir is connected by suitable conduit 144 and 146, which lead respectively to and from a hydraulic pump, not shown.

Motor 42 of the elevating unit 34 is controlled by solenoid-operated fluid valve 132. The core of valve 132 has two positions. In the position shown in the diagram, hydraulic fluid is returned directly to the reservoir without driving motor 42. When the core of valve 132 is moved to the left, as viewed in FIG. 7, it will cause hydraulic fluid to pass through motor 42 and thereby activate the same in order to drive the chain 44 which elevates the stack of boards 32 from conveyor 28 to the front end of advancing conveyor 36. The horizontal chains 60 of advancing conveyor 36 advance the short stacks of boards 32 across the top of the frame until stopped by stops 62, the chains 60 also being driven by motor 42. Switch 148, which is mounted on frame member 26 in FIG. 1 adjacent the lower end thereof and switch 150, which is carried by a stop 30, shown in FIGS. 1 and 2, normally are biased to open position. When the boards on conveyor 28 engage switch 150, the circuit is closed to the solenoid of valve 132 which moves the core of said valve to the left in the diagram shown in FIG. 7, thereby causing motor 42 to be activated. This lifts the boards off of the conveyor 28 and removes them from engagement with switch 150 which then is opened automatically. The opening of this switch has no effect on valve 132, however, since the core thereof stays in the left-hand position until the solenoid of valve 132 pulls it back to the right-hand position.

In FIG. 3 of the drawings, it will be seen that the switch 148 is tripped by a set of the board-lifting fingers 154 on the return run thereof, as shown in FIG. 1. When switch 148 is thus tripped, the current travels through the solenoid of valve 132 and returns the core thereof to the original mid-position and switch 148 automatically moves to open position. Under such circumstances, the valve 132 remains in the original neutral position until the next short stack of boards trips switch 150.

Motor 118, which raises and lowers the elevating frame 70 is controlled by solenoid valve 128 within the control box 134. As in regard to valve 132, the core thereof normally is biased to the central, neutral position. When the solenoid is energized, the core moves toward the left and stays there only until the solenoid is de-energized, whereupon it returns to the neutral, center position. However, when said core is in said left-hand position, motor 118 is activated in a direction to raise the elevating frame from its initial starting position below the upper span of the chain 60 in order to elevate the vertical sections 84 of chains 82 and thereby cause elevating frame 70 and the plate 76 thereon to engage and raise the layer of stacks of boards 32 thereon to a position above the upper end of stop 62. When the core of valve 128 is in the central, neutral position, the hydraulic fluid circulates back to the reservoir and motor 118 is de-activated. Switch 152 controls valve 128 to stop the elevating frame 70 in the aforementioned elevated position. Said switch is tripped by a plate 154 attached to elevating frame 70 and is operable to trip both switches 152 and 156, which is adjacent switch 152 in FIG. 5, when the elevating frame 70 moves upward past said switches. Switches 158 and 162, which are actuated by the members 68 operate when both are closed by the accumulation of boards 32 thereon, to by-pass switch 152, which is held open by the elevating frame 70 when in the normal initial position thereof in order that switch 158, see the diagram on FIG. 7, can be closed to start the operation of motor 118 to be activated in a direction to initiate upward movement of the elevating frame 70, as indicated by arrow 160, in FIG. 7. Switch 162, shown near the upper left-hand end of FIG.

1, is activated by detents 164 and 166, see FIG. 6 above motor 98, which are at opposite ends of and extend from the retracting plate 168 which underlies the elevating frame 70. As shown in FIG. 7, switch 162 has a plurality of contacts, a, b, c, d and e. The starting position of this compound switch is shown in solid lines in FIG. 7.

In the operation of switch 162, detent 164 establishes the initial position of switch 162 when the extending and retracting plate on elevating frame 70 is retracted on the previous operation of the apparatus. When the elevating frame 70 has moved vertically several inches, plate 170 thereon, see FIG. 6, opens switch 156 and switch 152 closes when plate 170 disengages the same. This will break the current path to switch 158 on fluid valve 128, shown in FIG. 7, and stops the elevating frame 70 in its uppermost level of movement, and when in said position, it holds the layer of accumulated boards above the chains 60 of advancing conveyor 36, and thereby also allows switches 158 and 162 to open when plate 170 opens one side of compound switch 156. In so doing, the other contacts of switch 156 are closed in order to supply current to the circuit 172, which is between switch 156 and the solenoid-operated fluid valve 130, which controls the operation of motor 98. Under such circumstances, current flows through contacts d and e of switch 162 which remains in said position until detent 166 changes the situation. From contact d, current travels to solenoid 174 of valve 130 and causes the support plate 76 to move outward which also starts detent 166 along its path which ultimately trips the spring 176, see FIG. 6, of switch 162 by activating actuating chain 106, which is driven by motor 98.

Switch actuator 116 actuates switch 178, which is tripped by a cam block 180 which is fixed to the underside of plate 76. This is shown near the left-hand end of FIG. 5, immediately below the left-hand end of chain 106. As the plate 76 moves out, block 180 trips switch 178 and moves it from the solid line to the dotted line position shown in FIG. 7, but just before detent 166 trips switch 162, current travels from contacts a to c of switch 162 and interrupts current between contacts d and e thereof, as well as between contacts a and b. The interruption of current to contact d, de-activates solenoid 174 and stops the extension of the projecting plate 76.

From contact c of switch 162, current travels through the now closed contact n and m of switch 178, as shown in FIG. 7, to energize solenoid 182 of solenoid valve 128, and thereby causes the elevating frame 70 to move in a lowering direction. During this operation, no current passes through o and p of switch 178, since they have been opened by cam block 180 on plate 76, the cam block 180 actually being carried by a sensor 184, see FIG. 6, which is mounted for limited pivotal movement of the outer end thereof adjacent the lower surface of plate 76.

When the elevating frame 70 and plate 76 carried thereby in its extended position are lowered sufficiently that the sensor 184 engages, for example, the top of the stack of previously deposited layers of boards 32, the sensor pivots upwardly and lifts the cam block 180 from the upper end of switch actuator 116 of switch 178 and this operation immediately returns switch 178 to the full line positions of the switch arms with respect to the contacts m, n, o, and p. In this event, the contacts m and n no longer carry contact therethrough and this causes the elevating frame 70 to stop in its downward movement. Also, when the switch 178 is in said full line position, the current path is established through contacts o and p, and thereby energizes solenoid 186, and as a result of this, motor 98 is activated in reverse direction from that described previously for purposes of retracting plate 76 and removes the same from the layer of boards 32 thereon and deposits the same upon the accumulated stack.

When the plate 76 is fully retracted, detent 164 thereon engages switch 162 in a manner to return the same to the position shown in full lines in FIG. 7. This relationship interrupts the current between contacts a and c and reconnects contact a with contact b. Hence, no current travels through the closed contacts d and e because the same has been interrupted by the operation of compound switch 156. Switch 152 also now is closed because the elevating frame 70 and plate 76 are down at the level of the top of the pallet stack. In view of the establishment of current between contacts a and b of switch 162, switches 152 and 156 are closed and solenoid 188 is energized on valve 128 which causes the elevating frame 70 and the now retracted plate 76 thereof to be elevated to the normal, initial position thereof in which the same is immediately below, but spaced from, engagement with the boards 32 on chains 60 of the advancing conveyor 36. The above-described operation completes the cycle of operation of the apparatus and the apparatus is now in position to have additional stacks of boards 32 elevated by the elevating unit 34 for deposit of said stacks upon the advancing conveyor 36 comprising chains 60.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A lumber stacker comprising in combination, a stationary vertical frame having opposite sides and a top portion, said frame being rectangular in cross-section and having vertical leg members at the corners thereof, said opposite sides extending between front and rear ends of said frame, an upwardly extending elevating conveyor at the front end of said frame operable to receive from a delivery conveyor similar groups of a plurality of boards positioned vertically and elevate the same to said top portion of said frame, means on said elevating conveyor operable at the upper end thereof to shift said groups of boards about the axes thereof to dispose said boards horizontally in the form of similar stacks, advancing conveyor means having an upper course movable horizontally along said top portion of said frame from the upper end of said elevating conveyor toward the rear end of said frame and positioned to receive at one end said stacks of horizontal elevated boards from said elevating conveyor, means to drive said advancing conveyor to move the upper course thereof toward the rear end of said frame, stop means adjacent said rear end of said frame operable to limit movement of said stacks of boards moved by said advancing conveyor and permit an accumulation of said stacks of boards thereon into a layer of abutting similar multiple stacks thereof while said upper course of said advancing conveyor slides beneath said accumulated stacks, a horizontal rigid elevating frame comprising end members extending transversely across said frame and side members fixed to said end members and extending substantially between the front and rear ends and movable vertically within said stationary frame toward and from an initial starting position at a level adjacent and below said upper course of said advancing conveyor, horizontally projectable board-supporting means carried by said elevating frame for movement within the plane of the upper part thereof, reversible power means operable to elevate said elevating frame into supporting engagement with the accumulated layer of stacks of boards upon said advancing conveyor means and raise said layer above said stop means and dispose the same for support upon said board-supporting means, additional reversible power means operable to project said board-supporting means outwardly beyond the end of said horizontal frame adjacent the rear end of said vertical frame and said reversible power means then operating to lower said elevating frame and projected board-supporting means onto a supporting surface to initiate the the formation of a stack of said layers, control means for said additional reversible power means operable to retract said board-supporting means from beneath said layer when said layer reaches said supporting surface or the top of an accumulated stack of said layers, and said reversible power means for said elevating frame then being operable to raise the same with said board-supporting means retracted thereon to said initial starting position of said elevating frame.

2. The stacker according to claim 1 in which said reversible power means for said elevating frame comprises endless chains supported by sprockets respectively at opposite sides of said stationary vertical frame and having vertical sections respectively adjacent the front and rear ends of said vertical frame adjacent said vertical leg members, means connecting corner portions of said elevating frame to said vertical sections of said chains, and a reversible motor connected commonly to said chains and operable to move said vertical sections simultaneously upward or downward in unison respectively to elevate and lower said elevating frame and board-supporting means thereon.

3. The stacker according to claim 1 in which said horizontally projectable board-supporting means comprises stack-supporting means positioned between the opposite sides of the upper portion of said elevating frame and comprising the uppermost means thereon, stationary parallel horizontal guide channels extending along the opposite sides of said elevating frame and having supporting means on opposite sides of said stack supporting means movable within said guide channels to support said stack-supporting means thereby.

4. The stacker according to claim 3 further including a reversible motor and a chain connected to said stack-supporting means and driven by said motor successively rearwardly and forwardly respectively to project said stack-supporting means rearwardly and retract the same forwardly to discharge stacks of lumber from said stack-supporting means.

5. The stacker according to claim 4 in which said supporting means of said stack-supporting means which are movable within said guide channels comprise guide rollers on the forward portion thereof to maintain said stack-supporting means substantially horizontal when projected rearwardly with a layer of stacks of lumber thereon.

6. The stacker according to claim 5 in which said stack-supporting means comprises flat rigid means and includes additional guide rollers mounted adjacent the rearward end of said rigid means and movable within said guide channels and operable to engage opposite edges of said rigid means when the same is projected rearwardly and thereby cooperating with said guide rollers on said forward portion of said rigid means and movable in said channels to provide substantially anti-friction support for said rigid means during rearward and forward movement thereof.

7. The stacker according to claim 4 in which said chain is a single chain supported by sprocket gears respectively mounted upon shafts adjacent the front and rear ends of the upper portion of said horizontal elevating frame and midway thereof.

* * * * *